United States Patent
Yoshida et al.

(10) Patent No.: US 6,418,320 B2
(45) Date of Patent: Jul. 9, 2002

(54) MOBILE STATION AND A METHOD OF REDUCING INTERFERENCE AMONG RADIO CHANNELS IN THE MOBILE STATION

(75) Inventors: Shousei Yoshida; Akihisa Ushirokawa; Hiroshi Furukawa, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/087,081

(22) Filed: May 29, 1998

(30) Foreign Application Priority Data

Aug. 12, 1997 (JP) .............................................. 9-228976

(51) Int. Cl.⁷ ................................................ H04Q 7/20
(52) U.S. Cl. ........................... 455/522; 455/69; 455/436
(58) Field of Search .......................... 455/69, 438, 439, 455/442, 443, 436, 522; 375/200; 370/331–32, 335

(56) References Cited

U.S. PATENT DOCUMENTS

| | | | |
|---|---|---|---|
| 5,056,109 A | * 10/1991 | Gilhousen et al. | ............. 375/1 |
| 5,101,501 A | * 3/1992 | Gilhousen et al. | ............. 455/33 |
| 5,109,390 A | * 4/1992 | Gilhousen et al. | ............. 375/1 |
| 5,267,261 A | * 11/1993 | Blakeney, II et al. | ............. 375/1 |
| 5,386,588 A | * 1/1995 | Yasuda | ....................... 455/33.1 |
| 5,485,486 A | * 1/1996 | Gilhousen et al. | ........... 375/205 |
| 5,491,717 A | * 2/1996 | Hall | ....................... 455/67.1 X |
| 5,603,096 A | * 2/1997 | Gilhousen et al. | ............. 455/69 |
| 5,689,815 A | * 11/1997 | Yamazaki et al. | ............. 455/69 |
| 5,771,451 A | * 6/1998 | Takai et al. | .................. 455/442 |
| 5,839,056 A | * 11/1998 | Hakkinen | ..................... 455/69 |
| 5,878,350 A | * 3/1999 | Nakamura et al. | ........... 455/442 |
| 5,893,035 A | * 4/1999 | Chen | ............................ 455/522 |
| 5,940,743 A | * 8/1999 | Sunay et al. | ................... 455/69 |
| 5,963,583 A | * 10/1999 | Davidovici et al. | .......... 375/200 |
| 5,982,760 A | * 11/1999 | Chen | ............................ 370/355 |

FOREIGN PATENT DOCUMENTS

| | | |
|---|---|---|
| CA | 2147922 | 10/1995 |
| EP | 0 680 160 | 11/1995 |
| WO | 95/35003 | 12/1995 |

* cited by examiner

Primary Examiner—Nay Maung
(74) Attorney, Agent, or Firm—Sughrue Mion, PLLC

(57) ABSTRACT

In a method of controlling transmission power in a mobile station which switches a plurality of base stations from one to another with a hand-off time interposed on switching, an increase of the transmission power is suppressed with reference to reception levels of pilot signals sent from the plurality of base stations which are divided into a first group of base stations under connection and a second group of base stations under non-connection. Specifically, the transmission power is slowly or gradually increased or kept constant when the reception level of the pilot signal sent from the second group base station exceeds that of the pilot signal sent from the first group base station.

27 Claims, 11 Drawing Sheets

MOBILE STATION AND A METHOD OF REDUCING INTERFERENCE AMONG RADIO CHANNELS IN THE MOBILE STATION

BACKGROUND OF THE INVENTION

This invention relates to a mobile station for use in a communication system and, in particular, to a method of controlling transmission power in the mobile station.

Heretofore, considerable attention has been devoted to a CDMA mobile radio communication system as a communication system of the type described. In such a CDMA mobile radio communication system, a plurality of base stations are spatially dispersed or arranged to define service areas, respectively, like in any other mobile radio communication systems. However, the CDMA mobile radio communication system is advantageous in that the same frequency can be used in each of the base stations to transmit a sequence of digital signals and a frequency resource can be therefore effectively utilized therein. In other words, radio channels are defined by a common frequency.

In this event, each digital signal is transmitted in the form of spread spectrum signals by using a code peculiar or pre-assigned to each of the base stations. In addition, a pilot signal is also usually pre-assigned to each base station to specify the respective base stations and is generated at a constant power level from each base station. Therefore, such a pilot signal may be called a constant power signal which is generated at a predetermined power level from each base station.

Herein, it should be considered that each of mobile stations is movable through various service areas of the base stations and must be therefore communicable with every base station. Thus, each mobile station is moved or traveled through the plurality of the service areas. In this event, each of the mobile stations continues to carry out communication during movement without any interruption of communication, switching the base stations from one to another. Such a switching operation will be referred as a handoff or hand-over operation.

On the other hand, each of the service areas is not always geometrically completely separated from one another but has a boundary spatially and partially overlapped with one another. Taking this into consideration, each mobile station is put into a state which is communicable with a plurality of the base stations when the hand-off operation is carried out within an overlapped area. In other words, the hand-off operation is carried out by the use of transmission and reception between a single mobile station and a plurality of the base stations in the CDMA cellular mobile radio communication system. Such a band-off operation is generally called a soft hand-off operation.

Herein, it is to be noted in the CDMA cellular mobile radio communication system that transmission electric power must be always minimized at each of the mobile stations while communication is usually carried out through a radio channel with the base station. Otherwise, interference inevitably takes place in the other radio channels because the same frequency is used in common to the other base stations. Consequently, the interference for the other radio channels can be reduced to a minimum. This enables concurrent communication of each base station with a lot of the mobile stations.

Taking the above into consideration, transmission power control should be executed in each mobile station to measure a transmission loss of each base station and to select the base station of a minimum transmission loss. As a result of the transmission power control, each mobile station is always connected to the base station of the minimum transmission loss.

More specifically, such transmission power control which is executed in each mobile station is classified into first and second types of transmission power control. In the first type of transmission power control, an open loop type of control operation is carried out by measuring a reception level of each pilot signals sent from the base stations and by determining the transmission power in each mobile station with reference to the results of measurements. In the second type of transmission power control, a closed loop type of control operation is made by measuring a quality of communication or a reception level of a desired signal in each base station under connection and by indicating transmission output power to the mobile station so that the quality of communication or the reception level is kept at a constant.

The first type of transmission power control can quickly control the transmission power in each mobile station on the basis of the reception level of the pilot signals measured at each mobile station and enables high speed control operation in response to an abrupt variation of the transmission loss. On the other hand, the second type of transmission power control responds to a variation of a desired signal due to fading and enables precise control operation so as to guarantee a constant quality of communication or a constant reception level of the desired signal. In other words, the second type of transmission power control is slow in control speed in comparison with the first type of transmission power control.

Under the circumstances, consideration is made about a mobile station which adopts such two types of transmission power control and which communicates with a certain base station under connection, which may be called an old base station. In addition, it is assumed that the mobile station is suddenly switched to a new base station under non-connection by the soft hand-off operation. In this event, it is preferable that the transmission power between the mobile station and the base station under connection is kept at a low level until connection is completed between the mobile station and the new base station during the soft hand-off operation in order to avoid the interference for the any other mobile stations.

However, it has been found out according to the inventors' experimental studies that the transmission power between the mobile station and the base station under connection, namely, the old base station practically becomes excessively large during the soft hand-off operation and, as a result, occurrence of interference among the radio channels is inescapable due to such excessive transmission power of a single mobile station.

SUMMARY OF THE INVENTION

It is an object of this invention to provide a transmission power control method which is used in a mobile station and which can prevent interference during a hand-off operation.

It is another object of this invention to provide a method of the type described, which can reduce an excessive increase of transmission power in the mobile station during the hand-off operation.

It is yet another object of this invention to provide a method of the type described, which is applicable to the mobile station in a CDMA cellular radio communication system.

It is still another object of this invention to provide a mobile station which is capable of reducing an increase of transmission power during a hand-off operation.

A method to which this invention is applicable is for use in controlling transmission power in a mobile station which is used in a CDMA radio communication system. The CDMA radio communication system comprises a plurality of base stations each of which transmits a pilot signal pre-assigned to each base station and a control signal for power control of the mobile station. The mobile station successively controls transmission power in response to the control signal sent from each of the base stations during communication with the base stations. According to an aspect of this invention, the method comprises the steps of periodically detecting, in the mobile station, a level of each pilot signal sent from the plurality of the base stations, checking out whether or not the mobile station is being connected to the plurality of the base stations, discriminating between a first group of the base stations under connection and a second group of the base stations under non-connection, comparing a first reception level of the pilot signals concerned with the first group of the base stations with a second reception level of the pilot signals concerned with the second group of the base stations to determine whether or not the first reception level is higher than the second reception level, and suppressing an increase of the transmission power in the mobile station by reducing the transmission power when the second reception level exceeds the first reception level.

When each of the mobile stations comprises first transmission power control means for adjusting the transmission power on the basis of a reception level concerned with the pilot signals and second transmission power control means for controlling the transmission power by a control step size on the basis of a control instruction sent from the base stations under connection, the method according to another aspect of this invention comprises the steps of receiving the pilot signals from the plurality of the base stations, determining the transmission power in inverse proportion to a maximum one of reception levels of the pilot signals, judging whether or not a first reception level of the pilot signals concerned with the base stations under connection exceeds a second reception level of the pilot signals concerned with the base stations under non-connection to produce a result of judgment, changing the control step size from one to another when the second reception level exceeds and does not exceed the first reception level.

The changing step may comprise the steps of decreasing the control step size when the second reception level exceeds the first reception level and increasing the control step size when the second reception level does not exceed the first reception level.

Alternatively, the changing step comprises the steps of rendering the control step size into a small step size for an increase of the transmission power when the second reception level exceeds the first reception level and rendering the control step size into a large step size for a decrease of the transmission power when the second reception level does not exceed the first reception level.

According to a further aspect of this invention, the method comprises the steps of receiving the pilot signals from the plurality of the base stations; determining the transmission power in inverse proportion to a maximum one of reception levels of the pilot signals, judging whether or not a first reception level of the pilot signals concerned with the base stations under connection exceed a second reception level of the pilot signals concerned with the base stations under non-connection to produce a result of judgment, minimizing the transmission power at every time interval for a predetermined time period when the second reception level exceeds the first reception level, and executing a control operation by the use of the first and the second transmission power control means either during a time period except the predetermined period or when the second reception level does not exceed the first reception level.

According to yet another aspect of this invention, the method comprises the steps of receiving the pilot signals from the plurality of the base stations, determining the transmission power in inverse proportion to a maximum one of reception levels of the pilot signals, judging whether or not a first reception level of the pilot signals concerned with the base stations under connection exceeds a second reception level of the pilot signals concerned with the base stations under non-connection to produce a result of judgment, decreasing the transmission power in the mobile station by a predetermined amount at every preselected time interval when the second reception level of the pilot signals exceeds the first reception level, and executing a control operation by the use of the first and the second transmission power control means either during the preselected time interval or when the second reception level does not exceed the first reception level.

Herein, the transmission power in the first transmission power control means may be determined in inverse proportion to a reception level concerned with a whole of the pilot signals.

According to still another aspect of this invention, the method comprises the steps of periodically detecting each pilot signal level from a plurality of base stations, checking out whether or not the base stations are under connection to discriminate between a first group of the base stations under connection and a second group of the base stations under non-connection, and reducing the transmission power in the mobile station to suppress an increase of the transmission power in the mobile station when a first reception level concerned with the first group of the base stations does not exceed a second reception level concerned with the second group of the base stations.

A method to which this invention is also applicable is for use in controlling transmission power in a mobile station in a radio communication system which comprise a plurality of base stations. The mobile station is continuously communicable through radio channels with the base stations by executing a hand-off operation during a hand-off time. According to another aspect of this invention, the method comprises the steps of detecting the hand-off time and lowering the transmission power in the mobile station during the hand-off time to mitigate interference among the radio channels.

A mobile station to which this invention is applicable is for use in a communication system which comprise a plurality of base stations. The mobile station is continuously communicable through radio channels with the base stations by executing a hand-off operation during a hand-off time. According to this invention, the mobile station comprises means for detecting the hand-off time and means for lowering the transmission power in the mobile station during the hand-off time to mitigate interference among the radio channels.

DESCRIPTION OF THE PREFERRED EMBODIMENTS

Figure 1:
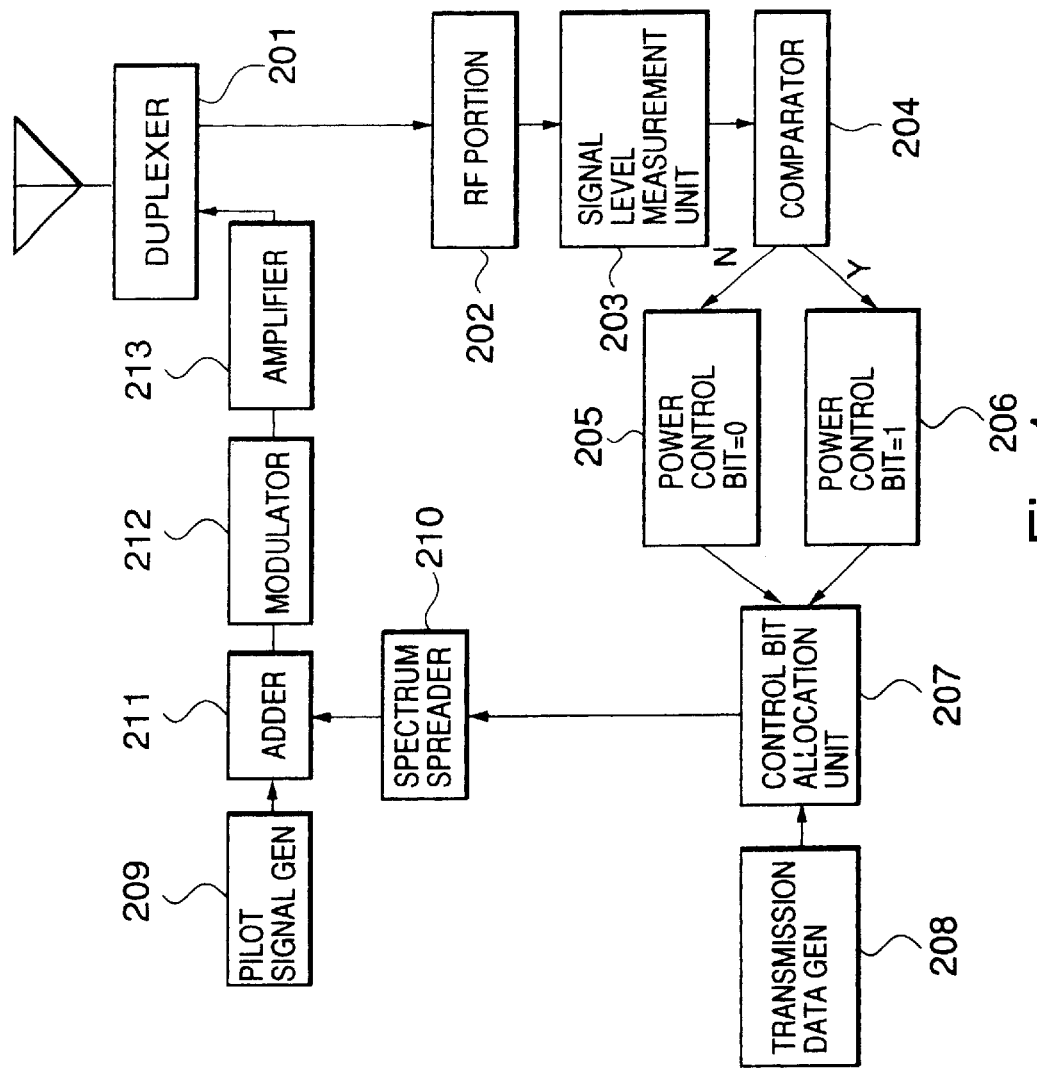
FIG. 1 is a block diagram of a base station for use in a conventional CDMA cellular mobile radio communication system.
Figure 2:
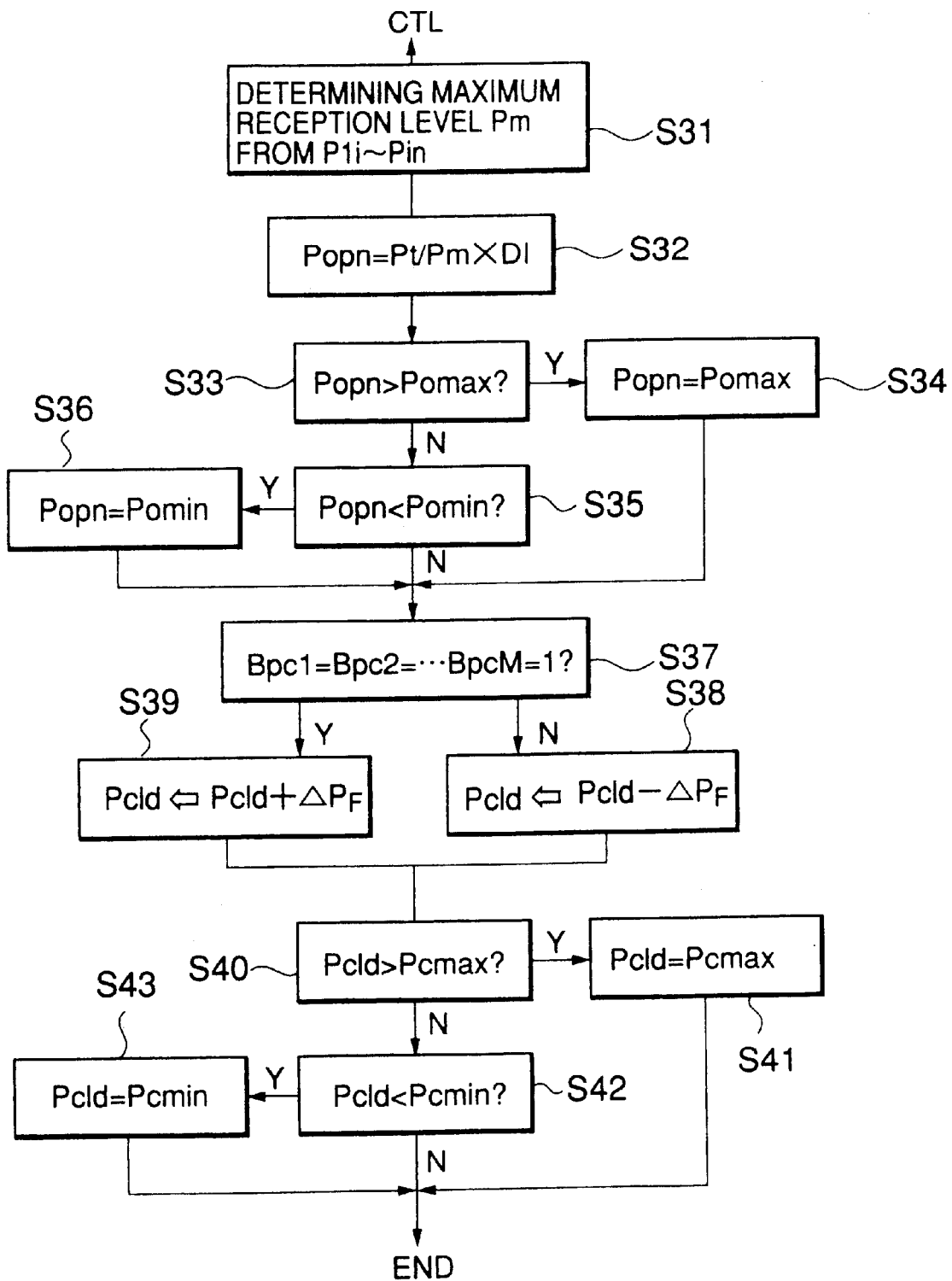
FIG. 2 is a flow chart for use in describing transmission power control operation of a conventional mobile station which is communicable with the base station illustrated in FIG. 1.

Referring to FIGS. 1 and 2, description will be made about a conventional CDMA cellular mobile radio communication system for a better understanding of this invention. The conventional CDMA cellular mobile radio communication system has a plurality of base stations each of which has a structure illustrated in FIG. 1 and a plurality of mobile stations operable in a manner to be described with reference to FIG. 2.

As shown in FIG. 1, each base station is supplied with a mobile station signal from the mobile stations through a duplexer 201. The mobile station signal received through the duplexer 201 is sent through a radio frequency (RF) portion 202 to a signal level measurement unit 203 to measure a reception level of a desired signal included in the mobile station signal and to produce a measured reception level.

A comparator 204 compares the measured reception level with a predetermined signal level determined for the desired signal to produce a transmission power control bit representative of a result of comparison. The illustrated comparator 204 produces the transmission power control bit of "0" (as shown by 205) when the measured reception level exceeds the predetermined signal level. On the other hand, the illustrated comparator 204 produces the transmission power control bit of "1" (as shown by 206) when the measured reception level does not exceeds the predetermined signal level. Herein, it is to be noted that the transmission power control bit of "0" indicates a decrease of transmission power in the mobile station under connection while the transmission power control bit of "1" indicates an increase of transmission power in the mobile station in question.

The transmission power control bit is inserted within a sequence of transmission data symbols sent from a transmission data generator 208. At any rate, such a transmission power control bit is delivered to the mobile station which switches the base stations from one to another during movement. As mentioned before, the soft hand-off operation is performed about a single mobile station and a plurality of base stations in the CDMA cellular mobile communication system to switch the base stations. Therefore. each mobile station must receive the transmission power control bits on the soft hand-off operation from a plurality of the base stations related to the soft hand-off operation. This means that the transmission power control bit sent from each base station must be discriminated from one to another by the mobile station.

In view of this fact, a transmission power control bit allocation unit 207 is operated to allocate each transmission power control bit to symbol position which is pre assigned to each base station at every time slot of the transmission data symbol sequence. Thus, the transmission data symbol sequence which includes the transmission power control bit is given to a spectrum spreader 210 which has a spread code peculiar to the base station and is produced as a spectrum spread data sequence.

On the other hand, the illustrated base station has a pilot signal generator 209 which produces a spectrum spread pilot signal subjected to spectrum spreading by the use of a spread code which is common to all of the base stations. In the illustrated example, the spectrum spread pilot signal is peculiar to each base station at a time instant This shows that the spectrum spread pilot signals from the respective base stations are generated with time offsets and are therefore arranged at different time instants. In any event, each pilot signal is generated at a predetermined power level from each base station and may be called a constant power signal.

The above-mentioned spectrum spread data sequence is added to the spectrum spread pilot signal by an adder 211 and is transmitted through a modulator 212, an amplifier 213, and the duplexer 201 to the mobile stations as a sequence of base station signals.

The base station signal sequence is received as a mobile reception signal by each of the mobile stations. Herein, it is kept in mind that each mobile station executes first and second types of transmission power control as mentioned in the preamble of the instant specification and has first and second power control loops for the first and the second types of the transmission power control, respectively. To this end, the first and the second power control loops are used to control transmission power in each mobile station by a transmission power controller in a manner to be described with reference to FIG. 2 below.

At first, each mobile station is assumed to be given first through N-th pilot signals from first through N-th ones of the base stations, respectively, where N is a positive integer. It is needless to say that each pilot signal is subjected to the spectrum spreading and is included in each base station signal, as mentioned before. Under the circumstances, the transmission power controller detects a maximum one of reception levels P11—P1N of the first through the N-th pilot signals to determine the maximum reception level Pm, as shown at a first step S31.

Next, the transmission power controller is operable to decide transmission power of the mobile station so that no interference takes place in the other mobile stations or other radio channels. For this purpose, the first type of the transmission power control is executed by the transmission power controller by the use of a reception level D1 which is received by each base station and which is determined for a desired wave. Specifically, transmission power Popn of the mobile station for the first type of the transmission power control is determined at a second step S32 so that the reception level in the base station becomes equal to D1 in accordance with the following Equation (1). The transmission power Popn for the first type of the transmission power control may. be called open loop transmission power hereinafter.

$$Popn=(Pt/Pm)\times D1, \tag{1}$$

where Pt is representative of the transmission power of each pilot signal sent from each base station and is assumed to be equal to one another in all of the base stations. In Equation (1), a reciprocal of (Pt/Pm), namely, (Pm/Pt) is representative of a transmission loss between the mobile station and each base station.

At a third step S33, the open loop transmission power Popn is compared by the transmission power controller with maximum transmission power Pomax which is transmissible in the first type of the transmission power control and which may be called open loop maximum transmission power.

When the open loop transmission power Popn exceeds the maximum transmission power Pomax, the open loop transmission power Popn is rendered into Pomax at a fourth step S34. Otherwise, the third step S33 proceeds to a fifth step S35 at which the open loop transmission power Popn is compared with minimum transmission power Pomin which is transmissible in the first type of the transmission power control. If Popn is smaller than Pomin, Popn is rendered into Pomin at a sixth step S36. From this fact, it is readily understood that the open loop transmission power Popn is restricted within a range between the maximum transmission power Pomax and the minimum transmission power Pomin by the first type of the transmission power control.

Subsequently, judgment is made at a seventh step S37 about the transmission power control bits which are sent from the base stations under connection. Thus, the second type of the transmission power control is started by the transmission power controller. Herein, it is assumed that the mobile station in question is connected to first through M-th base stations which are selected from the first through the N-th base stations. In this connection, M is equal to or smaller than N. At the seventh step S37, it is judged whether or not all of the transmission control bits sent from the first through the M-th base stations are equal to "1". When the transmission control bit of "0" is included, the seventh step S37 is followed by an eighth step S38 at which transmission power Pcld for the second type of the transmission power control is reduced by a power control step size ΔPF determined for the second type of the transmission power control. The transmission power Pcld may be referred to as closed loop transmission power.

On the other hand, when all of the transmission control bits sent from the first through the M-th base stations are equal to "1", the seventh step S37 is succeeded by a ninth step S39 at which the closed loop transmission power Pcld is increased by the power control step size ΔPF.

Thereafter, the closed loop transmission power Pcld is compared at a tenth step S40 with maximum transmission power Pcmax which is transmissible in the second type of the transmission power control and which may be called closed loop maximum transmission power. If the closed loop transmission power Pcld exceeds the closed loop maximum transmission power Pcmax, the tenth step S40 proceeds to an eleventh step S41 at which Pcld is rendered into Pcmax. Otherwise, the tenth step S40 is followed by a twelfth step S42 at which the closed loop transmission power Pcld is compared with minimum transmission power Pcmin which is transmissible in the second type of the transmission power control and which may be called closed loop minimum transmission power. If Pcld is smaller than Pcmin, Pcld is made to be equal to Pcmin S43. Thus, the closed loop transmission power is adjusted to a range between the closed loop maximum transmission power Pcmax and the closed loop minimum transmission power Pcmin.

In any event, excessive transmission power is often transmitted from each mobile station to the base station under connection during the soft hand-off operation when the first and the second types of transmission power control are executed in each mobile station.

Figure 3:
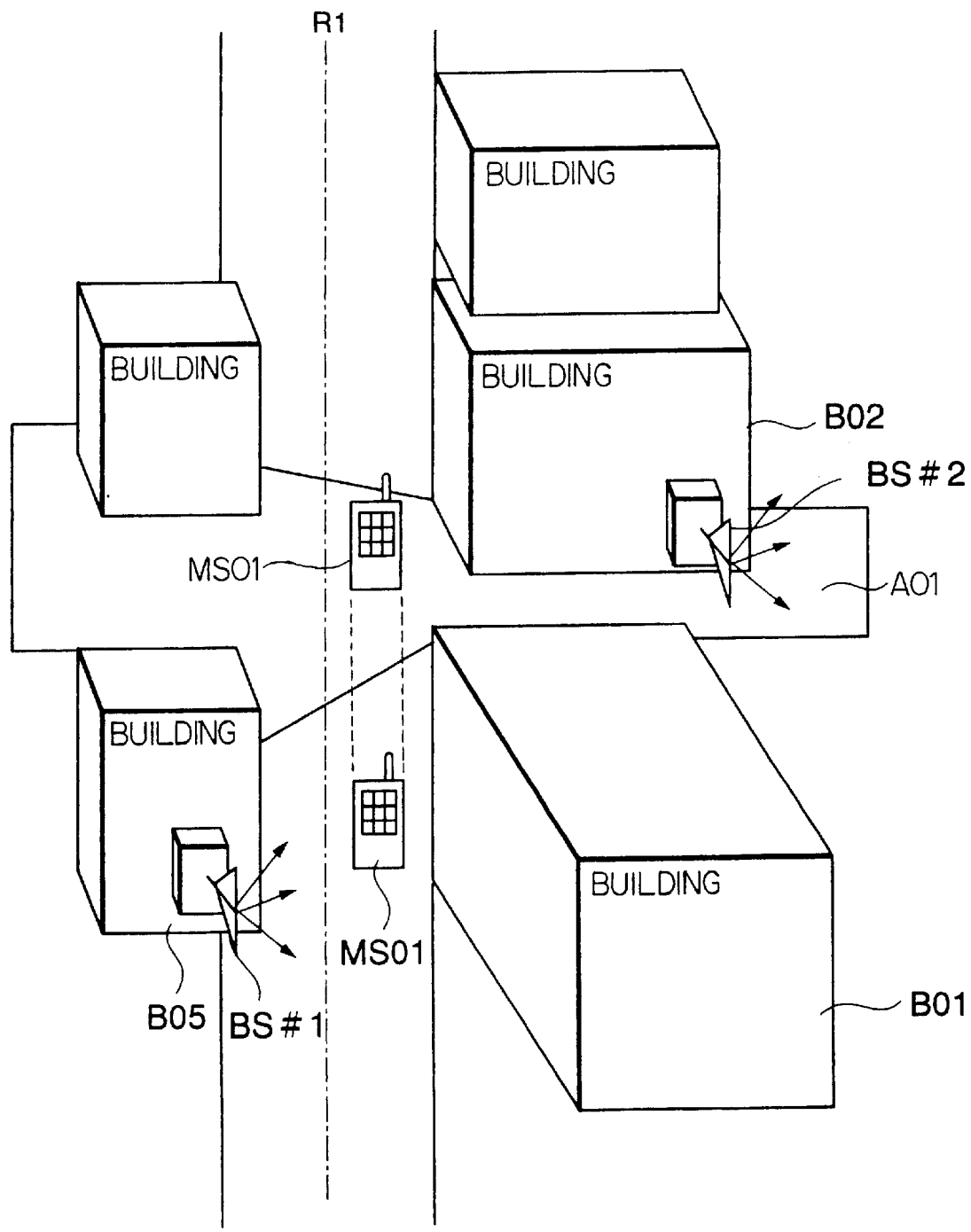
FIG. 3 shows a relationship of positions between base stations and a mobile station.

Referring to FIG. 3, let a mobile station MS01 carry out communication through a base station BS#1 located on a building B05 and move along a road R1 upwards of FIG. 3. When the mobile station MS01 passes through a building B01 and moved to an area A01 where visibility is good by a base station BS#2 which is located on a building B02 and which is not connected ever before. In this condition, it often happens that a transmission loss between the mobile station MS01 and the base station BS#2 becomes smaller than that between the mobile station MS01 and the base station BS#1 which is now connected to the mobile station MS01. Inasmuch as each pilot signal that is sent from the base stations and that is measured by the mobile station MS01 has a reception level which is in inverse proportion to the transmission loss, the measurement result of the mobile station MS01 in the area A01 is that the reception level of the pilot signal of the base station BS#2 is higher than that of the pilot signal of the base station BS#1.

In this event, the mobile station MS01 executes the first type of the transmission power control with reference to the maximum reception level of the pilot signal so that the transmission power Popn is quickly reduced Simultaneously, processing is started in the mobile station MS01 to connect the mobile station MS01 to the base station BS#2 which has the minimum transmission loss.

Figure 4:
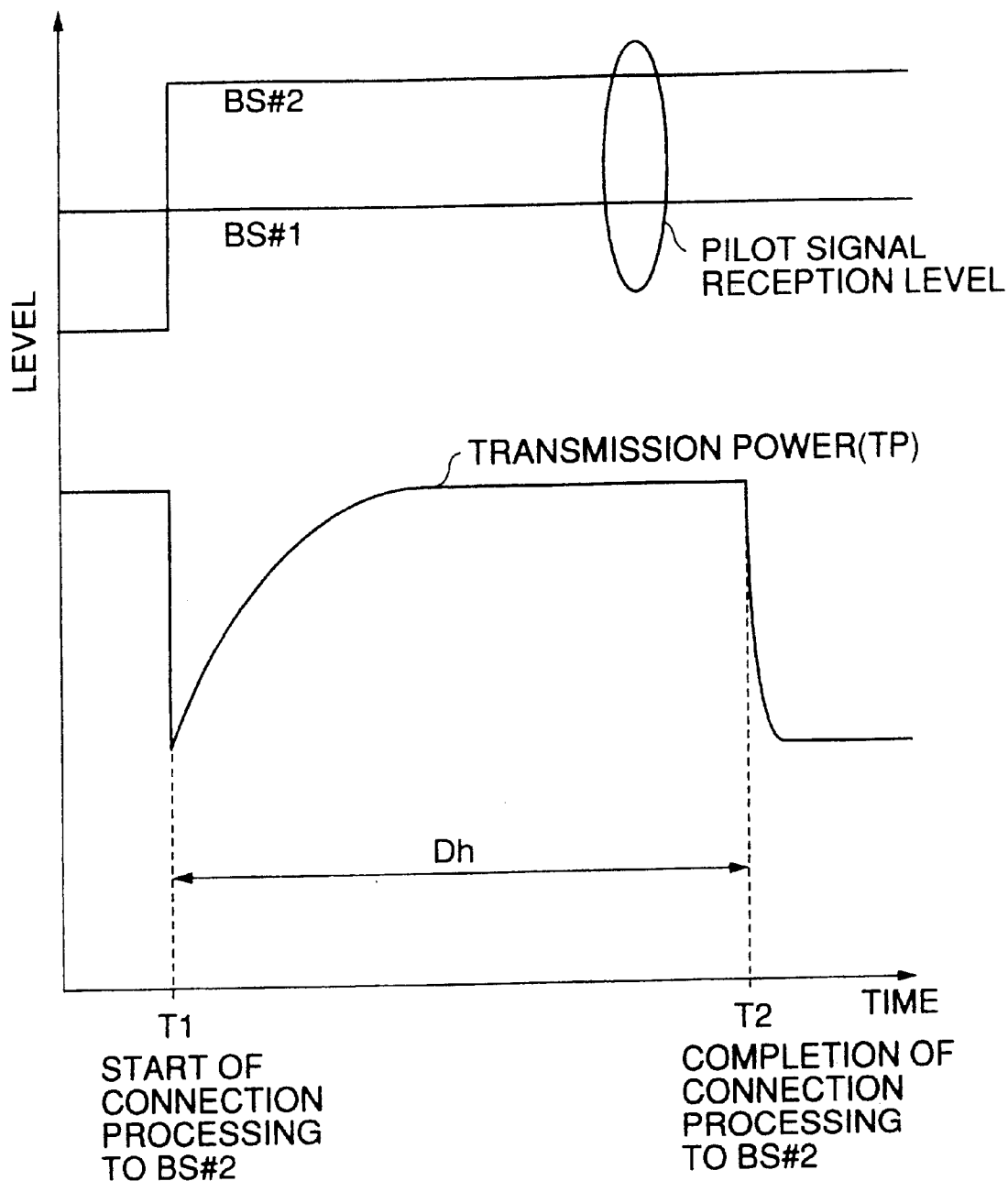
FIG. 4 is a time chart for use in describing the disadvantage of the conventional mobile station.

Referring to FIG. 4, transmission power of the mobile station MS01 is varied in the above-mentioned case. More specifically, the pilot signal reception level of the base station BS#2 in the mobile station MS01 abruptly exceeds the pilot signal reception level of the base station BS#1 at a time instant T1, as shown in FIG. 4. Therefore, the mobile station MS01 quickly reduces the transmission power by carrying out the first type of the transmission power control. At the same time, connection to the base station BS#2 is started by the mobile station MS01 with the connection to the base station BS#1 held in the mobile station MS01. In this case, it takes a time Dh to connect the mobile station MS01 to the base station BS#2. The time Dh may be referred to as a hand-off time.

During the time Dh, the transmission power is increased again, as shown in FIG. 4, on the basis of a transmission power control command sent from the base station BS#1 which is held at a connected state. When connection is completed between the mobile station MS01 and the base station BS#2 at a time instant T2, the mobile station MS01 starts the transmission power control operation on the basis of a command sent from the base station BS#2 and reduces the transmission power in accordance with the command from the base station BS#2.

As mentioned before, communication is carried out with excessive transmission power during the time Dh necessary for connection to the base station BS#2. This is because the transmission power is governed during the time Dh by the connected base station BS#1 in spite of the fact that the transmission power is once reduced at the time instant T1 in accordance with the base station BS#2 which exhibits the minimum transmission loss. This gives rise to interference for the base station BS#2 during the time Dh. Such interference brings about serious problem in the CDMA cellular mobile radio communication system which occupies the same frequency by a plurality of base stations. In other words, excessive transmission power of only one mobile station leads to interference among the plurality of the base stations, as pointed out in the preamble of the instant specification.

Figure 5:
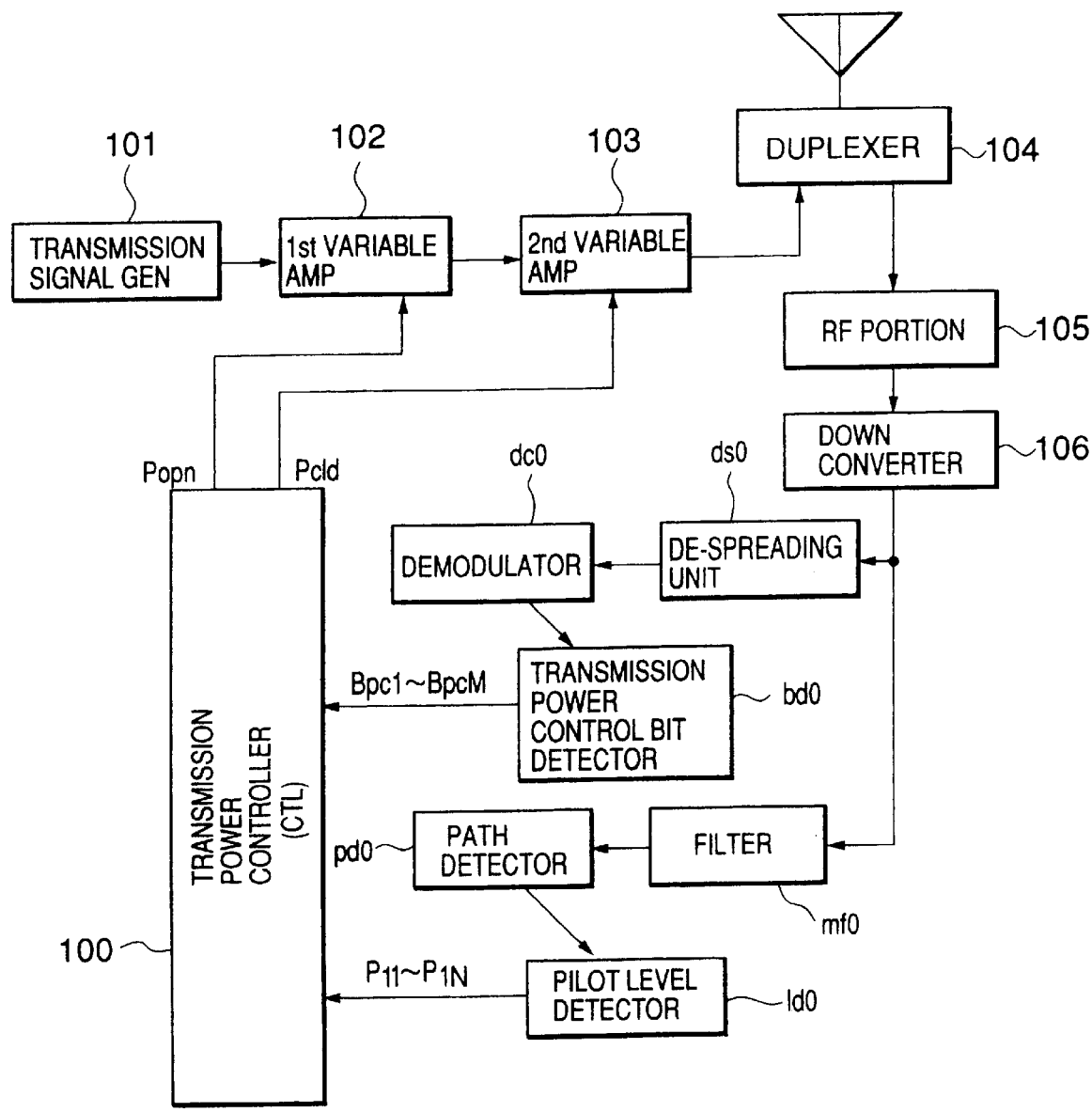
FIG. 5 is a block diagram of a mobile station which is operable in accordance with a method of this invention.
Figure 6:
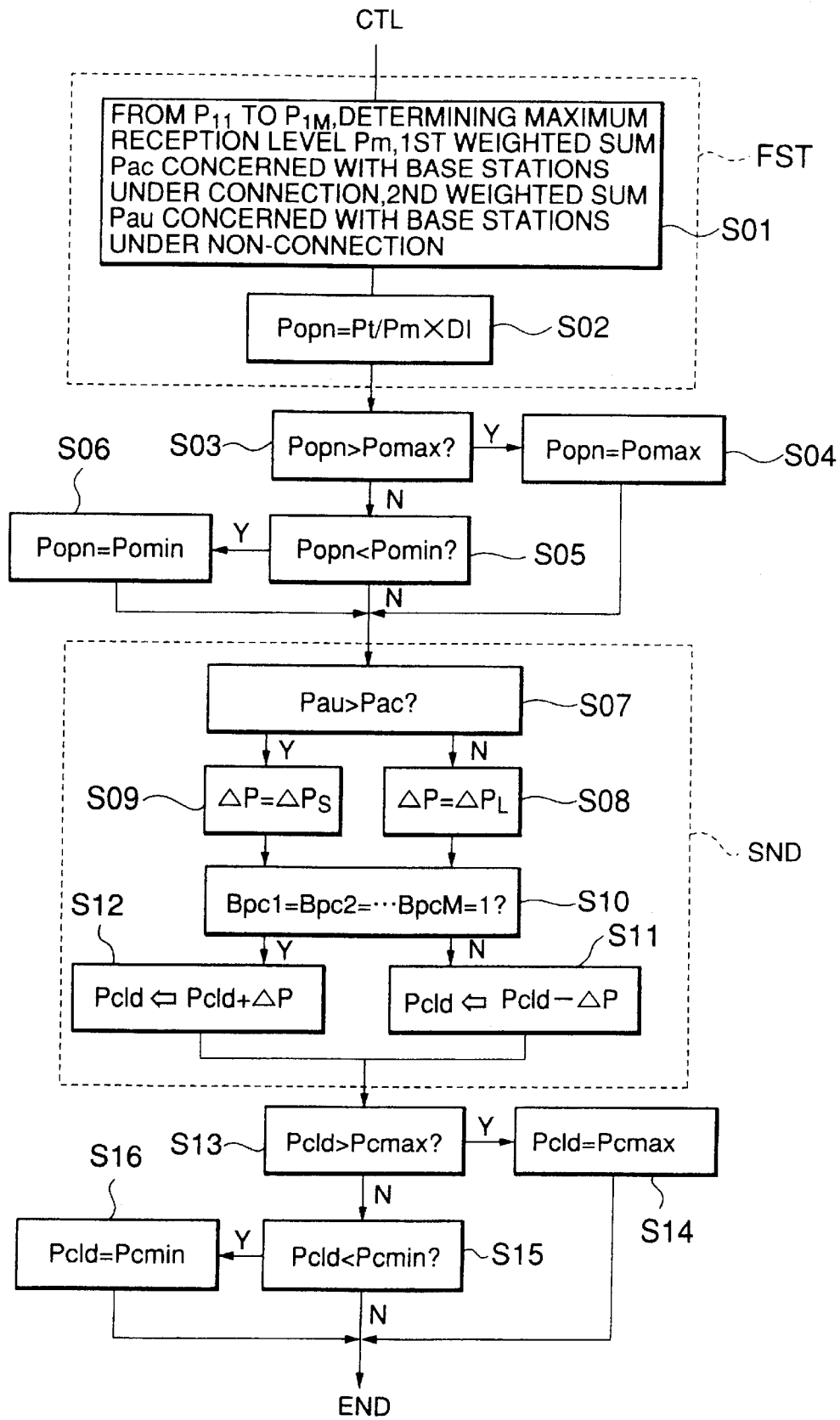
FIG. 6 is a flow chart for use in describing a method according to a first embodiment of this invention.

Referring to FIGS. 5 and 6, description will be made about a transmission power control method according to a first embodiment of this invention. The transmission power control method is executed in a mobile station as illustrated in FIG. 5. In FIG. 5, the illustrated mobile station has a transmission signal generator 101 which produces a transmission signal of a radio frequency subjected to spectrum spreading. The transmission signal is amplified by first and second variable amplifiers 102 and 103 and is thereafter sent to a duplexer 104 to be transmitted as the mobile station signal sequence. The first and the second variable amplifiers 102 and 103 are used for the first and the second types of the transmission power control, respectively, and are controlled by a transmission power controller (CTL) 100. Specifically, the first and the second variable amplifiers 102 and 103 are supplied from the CTL 100 with the open loop transmission power Popn and the closed loop transmission power Pcld, as mentioned in conjunction with FIG. 2, respectively.

On the other hand, a base station transmission signal is received as a mobile station reception signal and is delivered from the duplexer 104 to a radio frequency portion 105 and a down converter 106 to be converted into a sequence of base band signals. In the illustrated example, the base band signal sequence conveys first through N-th pilot signals Pl1—PlN sent from the first through the N-th base stations and first through M-th transmission power control bits Bpc1—BpcM sent from the first through the M-th base stations under connections, as mentioned before. Herein, the first through the N-th base stations stand for base stations from which the pilot signals can be received and are usually different in number from the first through the M-th base stations. This is because transmission power of each pilot signal is generally greater than that of a data signal sequence between each mobile station and each base station.

In FIG. 5, the base band signal is delivered through a de-spreading unit ds0 and a demodulator dc0 to a transmission power bit detector bd0 on one hand. The transmission power bit detector bd0 detects the first through the M-th transmission bits Bpc1 to BpcM and sends the same to the CTL 100. Likewise, the base band signal is also delivered to a pilot level detector Id0 through a filter mf0) matched with a spread code predetermined for each pilot signal and a path detector pd0. The pilot level detector Id0 measures the first through the N-th pilot signals Pl1—PlN to determine a maximum reception level of the first through the N-th pilot signals.

Now, the transmission power controller (CTL) 100 illustrated in FIG. 5 is operable in the manner shown in FIG. 6. In FIG. 6, first and second blocks FST and SND are representative of operations related to the first and the second types of the transmission power control that may be called an open loop type and a closed loop type, respectively. Herein, it is to be noted that the first through the N-th base stations are divided or classified into base stations (first through M-th base stations) under connection (will be collectively called a first group base station) and base stations under non-connection (will be called a second group base station) which are equal in number to N—M.

At first, the CTL 100 determines the maximum reception level Pm among the first through the N-th pilot signals Pl1 to PlN at a first step S01. At the first step S01, the illustrated CTL 100 selects the base stations (first through M-th base stations) under connection and calculates a first weighted sum Pac of the reception levels of the pilot signals sent from the base stations under connection. In addition, a second weighted sum Pau of the reception levels is calculated at the first step S01 in connection with the pilot signals sent from the base stations under non-connection. The base stations under connection may be called a first group of base stations and may be single or plural while the base stations under non-connection may be called a second group of base stations and may be also single or plural. In addition, a weight may be common to each reception level.

In any event, the first and the second weighted sums Pac and Pau are given by:

$$Pac = \sum_{i=1}^{N} ki \times fc(i) \times Pl_i \quad (2)$$

and $$Pau = \sum_{i=1}^{N} ki \times \{1 - fc(i)\} \times Pl_i \quad (3)$$

where fc(i)=1 (when the mobile station is being connected to an i-th base station)
=0 (when it is not connected to the i-th base station yet).

In Equations (2) and (3), ki is representative of a weight coefficient assigned to the i-th base station; and Pl$i$ the reception level of the pilot signal sent from the i-th base station. Each weight coefficient ki may be set to a common value of "1" or may be equal to Pl$i$. Alternatively, ki may be determined in the following manner. Namely, kcm=1, kum=1, and ki=0 (i is not equal to both of the numbers cm and um), where cm is representative of the number assigned to the base station which has a maximum level of Pl$i$ within the base stations of fc(i)=1; um is representative of the number assigned to the base station which has a maximum level of Pl$i$ within the base stations of fc(i)=0.

Referring back to FIG. 6, the CTL 100 illustrated in FIG. 5 completes the first step S01 and proceeds to a second step S02 at which the open loop transmission power Popn for the open loop control is calculated like at the second step S32 of FIG. 2 in accordance with Equation (1) so that the reception level in each base station becomes equal to D1. Thereafter, the second step S02 is succeeded by a third step S03 at which the open loop transmission power Popn is compared in the CTL 100 with the open loop maximum transmission power Pomax which is transmissible in the open loop transmission power control. If the open loop transmission power Popn exceeds the open loop maximum transmission power Pomax, the third step S03 is followed by a fourth step S04 at which Popn is rendered into Pomax, like at the fourth step S34 in FIG. 2.

Otherwise, the third step S03 proceeds to a fifth step S05 at which Popn is compared with the open loop minimum transmission power Pomin which is transmissible in the open loop transmission power control. When Popn is smaller than Pomin, a sixth step S06 succeeds the fifth step S05 to make Popn equal to Pomin.

Subsequently, a seventh step S07 is executed to judge whether or not the second weighted sum Pau exceeds the first weighted sum Pac. Namely, judgment is made at the seventh step S07 about the formula Pau>Pac, as illustrated in FIG. 6.

Let the second weighted sum Pau be smaller than the first weighted sum Pac. This shows that the transmission power of the base stations under connection is greater than that of the base stations under non-connection and that the base stations may not be switched from the first group of the base stations to the second group of the base stations. In this event, the seventh step S07 is succeeded to an eighth step S08 at which a transmission power control step size is rendered into ΔPL which may be named a first control step size.

On the other hand, when the second weighted sum Pau exceeds the first weighted sum Pac, namely, Pau>Pac, the seventh step is followed by a ninth step S09 at which the transmission power control step size is rendered into ΔPS which is smaller than ΔPL and which may be named a second control step size. From this fact, it is readily understood that the transmission power step size becomes small when the second weighted sum Pau related to the base stations under non-connection exceeds the first weighted sum Pac related to the base stations under connection and that the transmission power is slowly or gradually increased in the mobile station in accordance with ΔPS in a case as mentioned in conjunction with FIG. 3.

At a tenth step S10, the CTL 100 judges whether or not the transmission power control bits Bpc1—BpcM sent from the first through the M-th base stations under connection are all equal to "1". Let any one of the control bits Bpc1—BpcM be not equal to "1". This shows that the transmission power must be decreased by the mobile station to avoid interference due to excessive transmission power in either one of the base stations under connection. Taking this into consideration, the tenth step S10 is succeeded by an eleventh step S11 at which the closed loop transmission power Pcld is decreased by a transmission power control step size ΔP which is determined for the second type or the closed loop transmission power control and which may be referred to as a third control step size.

If all the control bits Bpc1—BpcM are equal to "1", the closed loop transmission power Pcld is increased at a twelfth step S12 by the third control step size ΔP. The third control step size ΔP may be equal to the first control step size ΔPL when Pau<Pac while the third control step size ΔP may be equal to the second control step size when Pau>Pac.

At a thirteenth step S13, the closed loop transmission power Pcld obtained by the above steps is compared with the closed loop maximum transmission power Pcmax which is transmissible in the second type of the transmission power control. When Pcld exceeds Pcmax, the closed loop transmission power Pcld is made to be equal to Pcmax at a fourteenth step S14. Otherwise, the thirteenth step S13 is succeeded by a fifteenth step S15 at which the closed loop transmission power Pcld is compared with the closed loop minimum transmission power Pcmin. If Pcd is smaller than Pcmin, the closed loop transmission power is rendered into Pcmin at a sixteenth step S16. At any rate, the closed loop transmission power Pcld is adjusted to a range between the closed loop maximum transmission power Pcmax and the closed loop minimum transmission power Pcmin, like in FIG. 2.

Herein, it is assumed that the method mentioned with reference to FIGS. 5 and 6 is applied to the case illustrated in FIG. 2. In this case, the reception levels of the pilot signals sent from the base stations BS#1 and BS#2 are varied together with the transmission power (depicted at TP) of the mobile station in the manner illustrated in FIG. 7.

Figure 7:
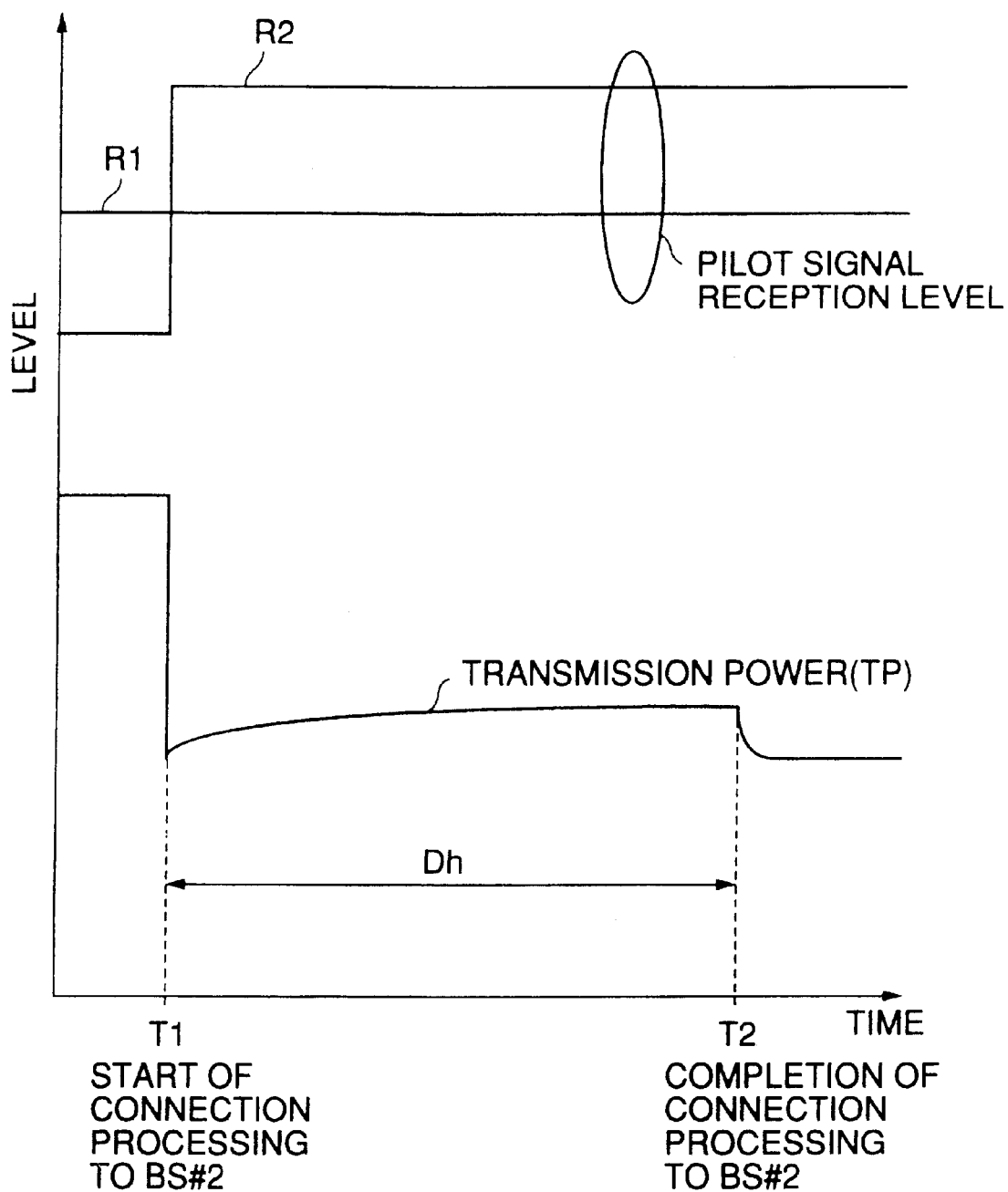
FIG. 7 shows a time chart for use in describing operation of the mobile station illustrated in FIGS. 5 and 6.

More specifically, the mobile station is given the pilot signals which are sent from the base stations BS#1 and BS#2 and which are received with reception levels depicted at R1 and R2 in FIG. 7, respectively. The reception levels R1 and R2 may be referred to as first and second reception levels, respectively.

In FIG. 7, the second reception level R2 suddenly exceeds the first reception level R1 at a time instant T1. In this situation, the transmission power TP of the mobile station MS01 is quickly reduced due to the open loop transmission power control, as shown in FIG. 7. Concurrently, the mobile station MS01 starts connecting operation to the base station BS#2 at the time instant T1. Thereafter, the mobile station MS01 starts communication with the base station BS#2 after lapse of the time Dh. As a result, the time Dh may be considered as a hand-off time, namely, a soft hand-off time.

As shown in FIG. 7, the transmission power TP is gradually increased during the hand-off time Dh at the control step size ΔP which is equal to the second control step size ΔPS smaller than the first control step size A PL. Therefore, an increase of the transmission power TP is slow during the hand-off time, which is useful to suppress excessive transmission power and to remarkably reduce interference for the base station BS#2 which gives a minimum transmission loss and which is now being connected to the mobile station MS01.

Anyway, it is readily understood that the method according to this invention may detect the hand-off time and lower the transmission power during the hand-off time to mitigate interference among the radio channels defined by a common frequency.

In the second block SND illustrated in FIG. 6, the control step size is reduced irrespective of an increase or a decrease of the transmission power. However, the control step size may be reduced only when the transmission power is increased to save excessive transmission power.

Figure 8:
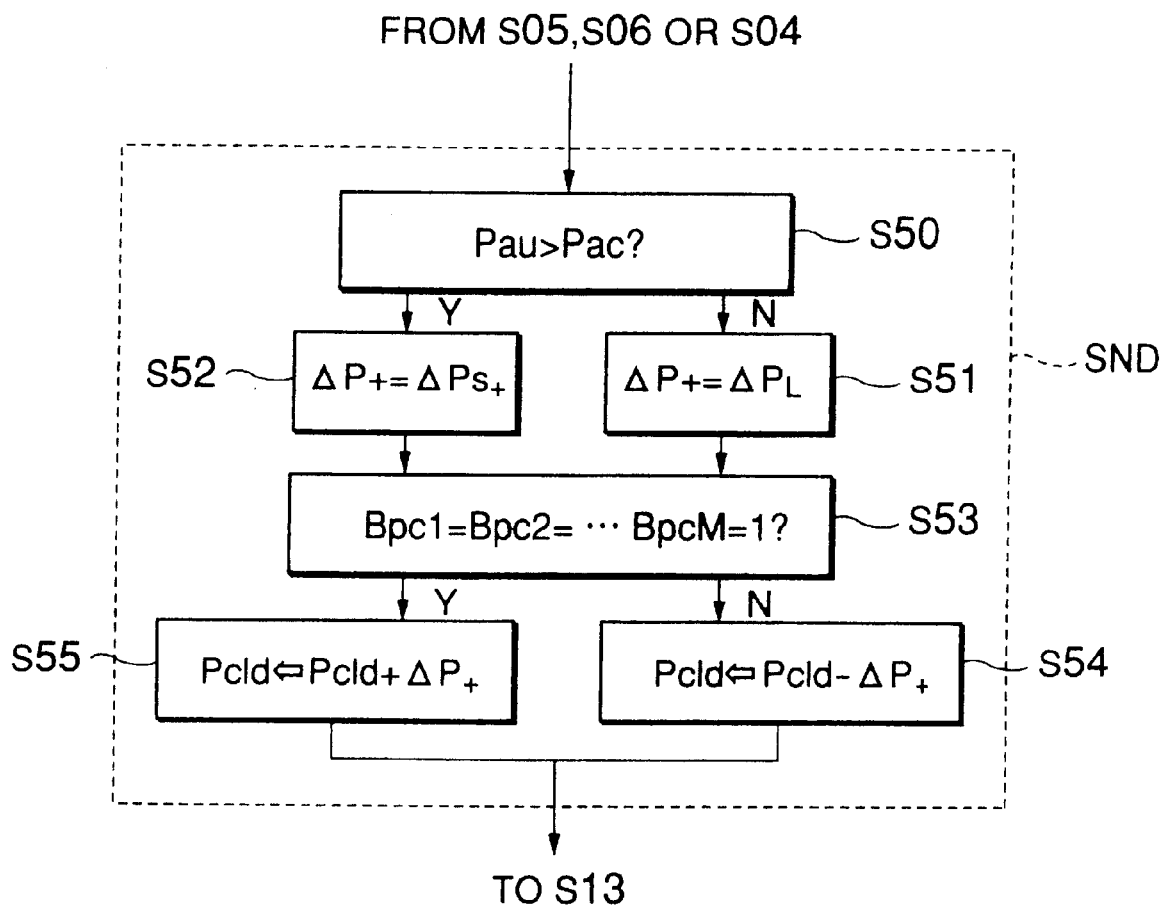
FIG. 8 is a flow chart for use in describing a method according to a second embodiment of this invention.

Referring to FIG. 8, description will be made about a method according to a second embodiment of this invention which is specified by a single block SND which corresponds to the block SND illustrated in FIG. 6. This means that the remaining processes or steps arc equivalent to the method shown in FIG. 6.

In FIG. 8, a step S50 is executed after the fifth the sixth, or the fourth step S05, S06, or S04 to judge whether or not Pau exceeds Pac. When Pau is smaller than Pac, the step S50 is followed by a step S51 which uses a transmission power increment step size ΔP+. Specifically, the transmission power increment step size ΔP+ is rendered into the control step size ΔPL at the step S51.

On the other hand, when Pau exceeds Pac, the step S5 proceeds to a step S52 at which the transmission power control step size ΔP+ is rendered into a control step size ΔPs+ which is smaller than ΔPL. In this event, when the control step size ΔPs+ becomes equal to 0 dB, an increase of the transmission power can be prohibited in the mobile station while the control step size ΔPs+ is kept at 0 dB.

Subsequently, it is judged at a step S53 whether or not the transmission power control bits Bpc1—BpcM are all equal to "1". When either one of the transmission power control bits Bpc1—BpcM does not take "1", the step S53 is succeeded by a step S54 at which the closed loop transmission power Pcld is decreased by ΔP. Otherwise, the step S53 is followed by a step S55 at which the closed loop transmission power Pcld is increased by ΔP+ which is determined for the closed loop.

As mentioned before, the control step size is varied to suppress an influence of an increase or a decrease of the transmission power. Alternatively, average transmission power may be controlled to prevent the above-mentioned interference. Such average transmission power may be controlled by keeping the control step size at a fixed size and by minimizing transmission power of the mobile station for a predetermined time interval at a prescribed time period.

Figure 9:
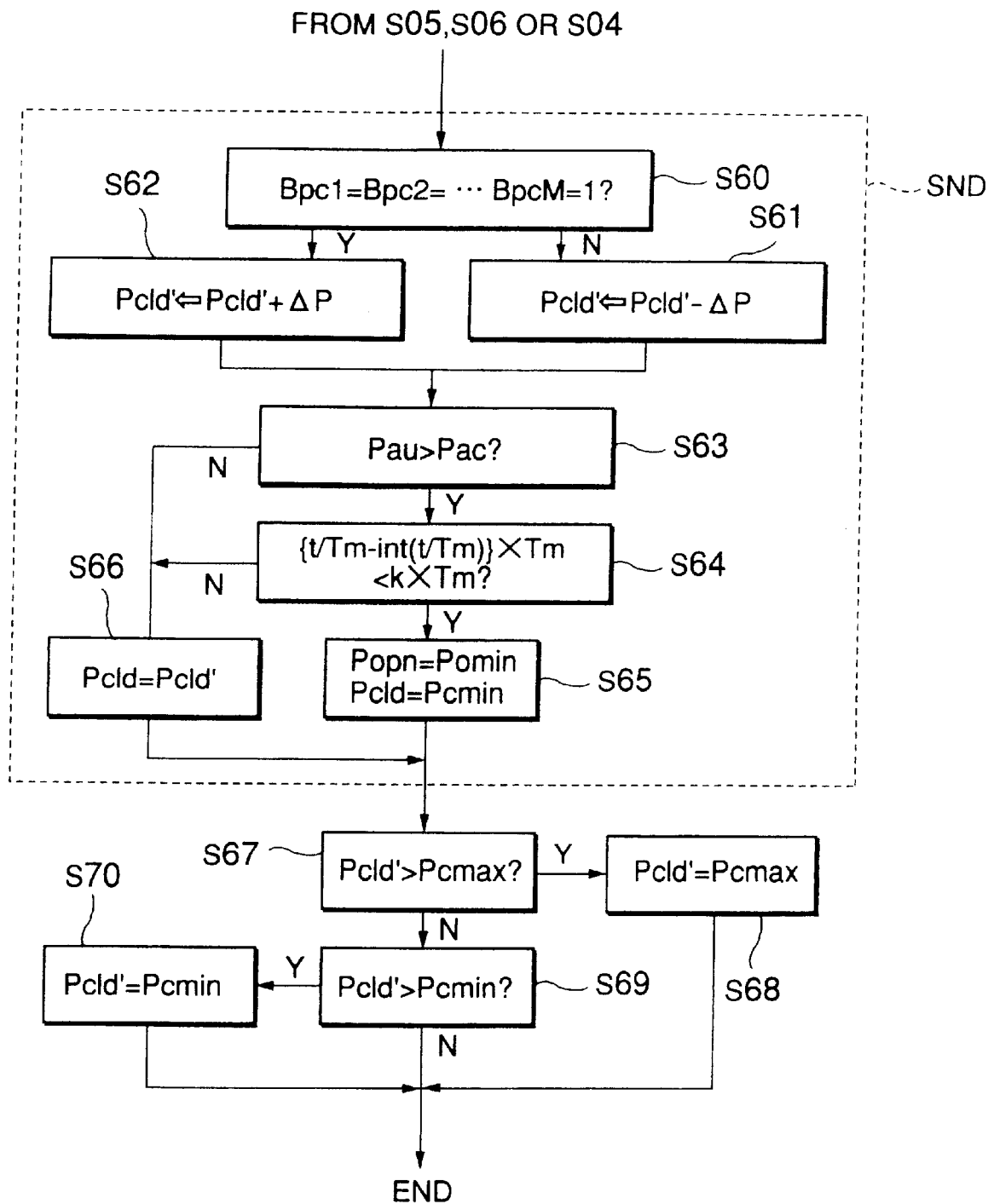
FIG. 9 is a flow chart for use in describing a method according to a third embodiment of this invention.

Referring to FIG. 9, a method according to a third embodiment of this invention controls transmission power of each mobile station by the use of average transmission power in the above-mentioned manner. In FIG. 9, illustration is made only about procedure which is executed by the mobile station after the fifth, the sixth, or the fourth step S05, S06, or S04 shown in FIG. 6.

In FIG. 9, a step S60 is for judging whether or not the transmission power control bits Bpc1—BpcM of the base stations under connection are all equal to "1". When the transmission power control bit of "0" is included in the transmission power control bits Bpc1—BpcM, the step S60 is succeeded by a step S61 at which closed loop transmission power (depicted at Pcld' in FIG. 9) is decreased by ΔP to be rendered into new closed loop transmission power Pcld'. When all the transmission power control bits Bpc1—BpcM are equal to "1", the closed loop transmission power Pcld' is increased by ΔP at a step S62 to be rendered into new closed loop transmission power Pcld'.

Subsequently, a step S63 is executed to judge whether or not Pau exceeds Pac. If Pau exceeds Pac, the step S63 is followed by a step S64 to judge whether or not the following equation (4) holds. Herein, Equation (4) is given by:

$$[(t/Tm)-int(t/Tm)] \times Tm < k \times Tm, \tag{4}$$

where t is representative of an absolute current time measured at a transmission power control period; Tm is representative of a power reduction period of the second type of transmission power control and is defined by a time measured at the transmission power control period, and k (=0–1) is representative of a reduction duration which is determined for the second type of the transmission power control and which is given by a rate to Tm.

When Equation (4) holds at the step S64, the step S64 proceeds to a step S65 at which the open loop transmission power Popn and the closed loop transmission power Pcld are rendered into open loop and closed loop minimum transmission power Pomin and Pcmin, respectively. Otherwise, the closed loop transmission power Pcld is rendered into Pcld' at a step S66.

Each of the steps S65 and S66 is followed by a step S67 at which the closed loop transmission power Pcld' is compared with the closed loop maximum transmission power Pcmax which is transmissible in the second type of the transmission power control. If Pcld'αexceeds Pcmax, Pcld' is made to be equal to Pcmax at a step S68.

Otherwise, Pcld' is compared at a step S69 with closed loop minimum transmission power Pcmin which is transmissible in the second type of the transmission power control. If Pcld' is smaller than Pcmin, the closed loop transmission power Pcld' is made to be equal to Pcmin at a step S70.

Alternatively, it is possible to suppress interference for the base station which gives a minimum transmission loss, by periodically reducing transmission power in each mobile station by a predetermined rate, with the transmission step size kept constant in the second type transmission power control.

Figure 10:
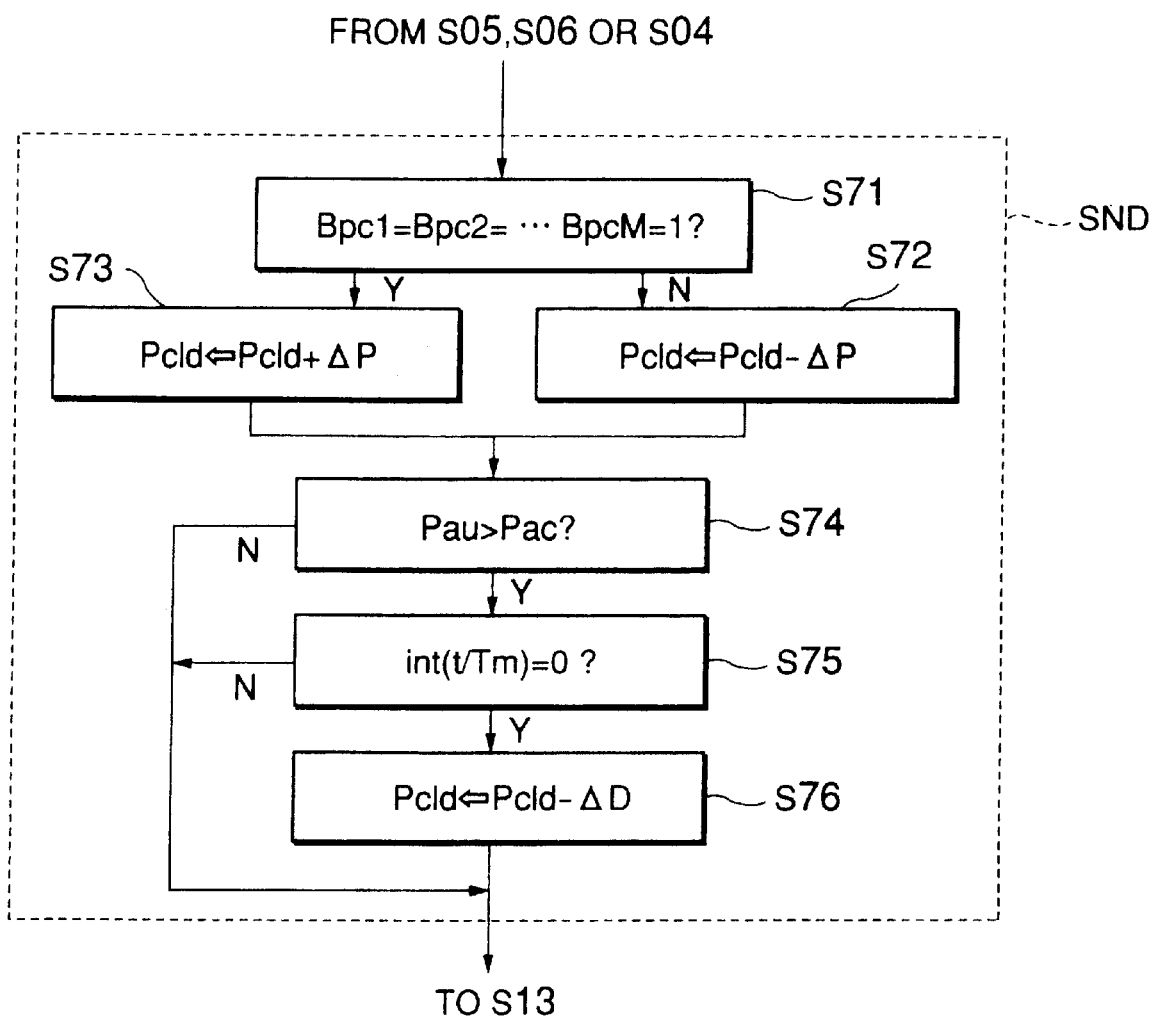
FIG. 10 is a flow chart for use in describing a method according to a fourth embodiment of this invention.

Referring to FIG. 10, a method according to a fourth embodiment of this invention will be described which is operable in the manner mentioned above. In FIG. 10 also, the second block SND alone is illustrated like in FIG. 8. Specifically, judgment is made at a step S71 about whether or not the transmission power control bits Bpc1 to BpcM of the base stations under connection are all equal to "1". When all the transmission power control bits Bpc1 to BpcM are not equal to "1", the closed loop transmission power Pcld is decreased by ΔP to render the decreased power into new closed loop transmission power Pcld at a step S72. On the other hand, when the transmission power control bits Bpc1 to BpcM are equal to "1", the step S71 is followed by a step S73 at which the closed loop transmission power Pcld is increased by ΔP to define increased closed loop transmission power as new closed loop transmission power Pcld.

Thereafter, Pau is compared at a step S74 with Pac to judge whether or not the former exceeds the latter. If Pau exceeds Pac, the step S74 proceeds to a step S75 to judge whether or not the following equation (5) holds. Herein, Equation (5) is given by:

$$int(t/T_M)=0, \tag{5}$$

where $T_M$ is representative of a transmission power reduction period which is determined for the second type of the transmission power control and which is defined by a time which is measured at every transmission power control period.

When Equation (5) holds at the step S75, a step S76 is executed to decrease the closed loop transmission power Pcld by an attenuation amount ΔD of transmission power and is followed by the thirteenth step S13 shown in FIG. 6. Otherwise, the step S75 is directly succeeded by the thirteenth step S13.

In the meanwhile, the open loop transmission power Popn for the first type transmission power control is determined by the use of the maximum reception level of the pilot signals. However, the open loop transmission power Popn for the first type transmission power control may be determined with reference to a total weighted reception level of all the pilot signals.

Figure 11:
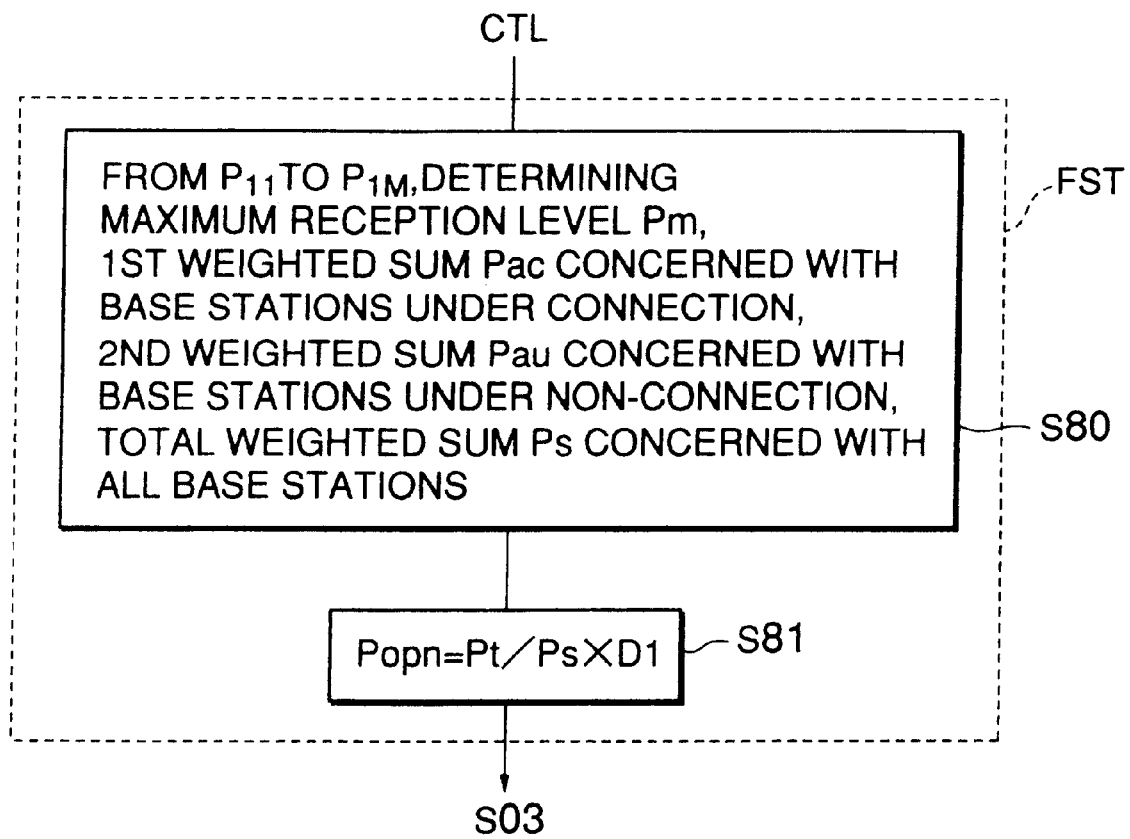
FIG. 11 is a flow chart for use in describing a method according to a fifth embodiment of this invention.

Referring to FIG. 11, description will be made about a method according to a fifth embodiment of this invention which is operable in the above-mentioned manner and which is specified by a first block FST which corresponds to that of FIG. 6. At a step S80 in the first block PST, all reception levels of the first through the N-th pilot signals are used to define a maximum reception level Pm, to calculate the first weighted sum Pac of the pilot signals sent from the base stations under connection, and to calculate the second weighted sum Pau of the pilot signals sent from the base stations under non-connection. Furthermore, the total weighted sum Ps of the reception levels of all the pilot signals P11 to P1N is also calculated at the step S80. Thereafter, the step S80 proceeds to a step S81 at which open loop transmission power Popn for the first type transmission power control is determined by:

$$Popn=(Pt/Ps) \times D1, \tag{6}$$

where D1 is representative of a reception level of a desired wave in a base station. In other words, the step S81 is executed to determine the open loop transmission power Popn so that the reception level in the base station becomes equal to D1. Subsequently, the step S81 is followed by the third step S03 illustrated in FIG. 6.

The method illustrated in FIG. 1 is effective in the case where transmission losses are comparatively small in relation to a plurality of base stations, although they are larger than the minimum transmission loss concerned with the base station under connection. With the above-mentioned method, interference for the plurality of the base stations can be kept at a low level. This is because the total weighted sum of all the pilot signals are referenced on decision of the open loop transmission power Popn.

While this invention has thus far been described in conjunction with several embodiments thereof, it will be readily possible for those skilled in the art to put this invention into practice in various other manners. For example, this invention is not restricted to the CDMA cellular mobile radio communication system but can be applied to a system which requires to reduce interference between radio channels. At any rate, the interference can be reduced among the radio channels by suppressing excessive transmission power in each mobile station with reference to reception levels of the pilot signals. Instead of the pilot signals, any other signals may be detected or monitored in the mobile station as the constant power signals generated at the constant power level by the base stations.

What is claimed is:

1. A method of controlling transmission power in a mobile station which is used in a CDMA cellular mobile radio communication system, said CDMA cellular mobile radio communication system comprising a plurality of base stations each of which transmits a pilot signal pre-assigned to each base station and a control signal for power control of the mobile station, said mobile station successively controlling transmission power in response to the control signal sent from each of the base stations during communication with the base stations, comprising the steps of:

detecting, in the mobile station, a level of each pilot signal sent from the plurality of base stations;
    determining whether or not the mobile stations is connected to the plurality of the base stations;
    discriminating between a first group of the base stations under connection and a second group of the base stations under non-connection;
    comparing a first reception level of the pilot signals concerned with the first group of the base stations with a second reception level of the pilot signals concerned with the second group of the base stations to determined whether or not the first reception level is higher than the second reception level; and
    limiting an increase of the transmission power in the mobile station in response to the second reception level exceeding the first reception level.

2. A method as claimed in claim 1, wherein the detecting step is periodically carried out in the mobile station.

3. A method of controlling transmission power in a CDMA cellular mobile radio communication system which comprises a plurality of base stations each of which transmits a pilot signal pre-assigned to each base station and a plurality of mobile stations communicable with the base stations, each of the mobile stations comprising first transmission power control means for adjusting the transmission power on the basis of a reception level concerned with the pilot signals and second transmission power control means for controlling the transmission power by a control step size on the basis of a control instruction sent from the base stations under connection, comprising the steps of:

receiving the pilot signals from the plurality of the base stations;
    determining the transmission power in inverse proportion to a maximum one of reception levels of the pilot signals;
    judging whether or not a first reception level of the pilot signals concerned with the base stations under connection exceeds a second reception level of the pilot signals concerned with the base stations under non-connection to produce a result of judgement; and
    changing the magnitude of the control step size based upon said result of judgement.

4. A method as claimed in claim 3, wherein the changing step comprises the steps of:

decreasing the magnitude of control step size when the second reception level exceeds the first reception level; and
    increasing the magnitude of the control step size when the second reception level does not exceed the first reception level.

5. A method as claimed in claim 3, wherein the changing step comprises the steps of:

rendering the control step size into a small step size for an increase of the transmission power when the second reception level exceeds the first reception level; and
    rendering the control step size into a large step size for a decrease of the transmission power when the second reception level does not exceed the first reception level.

6. A method as claimed in claim 3, wherein the transmission power in the first transmission power control means is determined in inverse proportion to a reception level concerned with a whole of the pilot signals.

7. A method as claimed in claim 1, wherein each of the first and the second reception levels is determined by a weighted sum of the reception levels of the pilot signals.

8. A method as claimed in claim 3, wherein each of the first and the second reception levels is determined by a weighted sum of the reception levels of the pilot signals.

9. A method of controlling transmission power in a CDMA cellular mobile radio communication system which comprises a plurality of base stations each of which transmits a pilot signal pre-assigned to each base station and a plurality of mobile stations communicable with the base stations, each of the mobile stations comprising first transmission power control means for adjusting the transmission power on the basis of a reception level concerned with the pilot signals and second transmission power control means for controlling the transmission power by a control step size on the basis of a control instruction sent from the base stations under connection, comprising the steps of:

receiving the pilot signals from the plurality of the base stations;
    determining the transmission power in inverse proportion to a maximum one of reception levels of the pilot signals;
    judging whether or not a first reception level of the pilot signals concerned with base stations under connection exceeds a second reception level of the pilot signals concerned with base stations under non-connection to produce a result of judgement;
    minimizing the transmission power at selected time intervals during a time period when the second reception level exceeds the first reception level; and
    executing a control operation by the use of the first and the second transmission power control means either during said time period, excluding the selected time intervals, or when the second reception level does not exceed the first reception level.

10. A method as claimed in claim 9, wherein the transmission power in the first transmission power control means is determined in inverse proportion to a reception level concerned with a whole of the pilot signals.

11. A method as claimed in claim 9, wherein each of the first and the second reception levels is determined by a weighted sum of the reception levels of the pilot signals.

12. A method of controlling transmission power in a CDMA cellular mobile radio communication system which comprises a plurality of base stations each of which transmits a pilot signal pre-assigned to each base station and a plurality of mobile stations communicable with the base stations, each of the mobile stations comprising first transmission power control means for adjusting the transmission power on the basis of a reception level concerned with the pilot signals and second transmission power control means for controlling the transmission power by a control step size on the basis of a control instruction sent from the base stations under connection, comprising the steps of:

receiving the pilot signals from the plurality of the base stations;

determining the transmission power in inverse proportion to a maximum one of reception levels of the pilot signals;

judging whether or not a first reception level of the pilot signals concerned with the base stations under connection exceeds a second reception level of the pilot signals concerned with the base stations under non-connection to produce a result of judgement;

decreasing a magnitude of said control step size by a predetermined amount at selected time intervals during a time period when the second reception level of the pilot signals exceeds the first reception level; and executing a control operation by the use of the first and second transmission power control means either following the decrease in magnitude of said control step size or when the second reception level does not exceed the first reception level.

13. A method as claimed in claim 12, wherein the transmission power in the first transmission power control means is determined in inverse proportion to a reception level concerned with a whole of the pilot signals.

14. A method as claimed in claim 12, wherein each of the first and the second reception levels is determined by a weighted sum of the reception levels of the pilot signals.

15. A method of controlling transmission power in a mobile station in a CDMA cellular mobile radio communication system, comprising the steps of:

detecting each pilot signal level from a plurality of base stations;

determining whether or not the base stations are under connection to discriminate between a first group of the base stations under connection and a second group of the base stations under non-connection; and controlling the transmission power in the mobile station to reduce an increase of the transmission power in the mobile station in response to a first reception level concerned with the first group of base stations not exceeding a second reception level concerned with the second group of the base stations.

16. A method as claimed in claim 15, wherein the detecting step is periodically carried out in the mobile station.

17. A method as claimed in claim 15, wherein each of the first and the second reception levels is determined by a weighted sum of the reception levels of the pilot signals.

18. A method of controlling transmission power in a mobile station in a radio communication system which comprises a plurality of base stations, the mobile station being continuously communicable through radio channels with the base stations by executing a hand-off operation during a hand-off time, comprising the steps of:

measuring the hand-off time that is determined in the mobile station; and lowering the transmission power in the mobile station by the use of a result of monitoring of a plurality of reception signals that are sent from the plurality of the base stations, during the hand-off time to mitigate interference among the radio channels, in response to a magnitude of a pilot signal from an unconnected one of said base stations exceeding a magnitude of a pilot signal from a connected one of said base stations.

19. A method as claimed in claim 18, wherein the radio channels are defined by a common frequency.

20. The method of claim 18, wherein the determining step comprises the steps of:

classifying the base stations into a first group of base stations connected to the mobile station and a second group of base stations unconnected to the mobile station;

detecting reception levels of the first and the second groups of the base stations; and comparing the reception levels with each other to determine the hand-off time to produce the result of the monitoring.

21. The method of claim 18, wherein the lowering step is carried out by reducing the transmission power by a fixed amount of power.

22. A method as claimed in claim 18, comprising sending the reception signals as pilot signals from the base stations and periodically measuring said pilot signals by the mobile station.

23. The method of claim 18, wherein said transmission power is lowered without requiring a response from said mobile station to any of said base stations.

24. A method of controlling transmission power in a mobile station in a radio communication system which comprise a plurality of base stations, the mobile statio being continuously communicable through radio channels with base stations by executing a hand-off operation during a hand-off time, comprising:

determining the hand-off time by classifying the plurality of base stations into a first group of base stations under connection and a second group of base stations under non-connection, comparing a first reception level concerned with the first group of base stations with a second reception level concerned with the second group of base stations to judge whether or not the second reception level exceeds the first reception level, and deciding the hand-off time when the second reception level exceeds the first reception level; and lowering the closed loop transmission power in the mobile station during the hand-off time to mitigate interference among the radio channels.

25. A mobile station for use in a communication system which comprises a plurality of base stations, the mobile station being continuously communicable through radio channels with the base stations by executing a hand-off operation during a hand-off time, comprising:

means for measuring the hand-off time that is determined in the mobile station; and means for lowering the transmission power in the mobile station by the use of a result of monitoring a plurality of reception signals, sent from the plurality of the base stations, during the hand-off time that is determined by said means for determining, to mitigate among the radio channels, in response to a magnitude of a pilot signal from an unconnected one of said base stations exceeding a magnitude of a pilot signal from a connected one of said base stations.

26. The mobile station of claim 25, wherein the measuring means comprises:

a means for classifying the base stations into a first group of base stations connected to the mobile station and a second group of base stations unconnected to the mobile station;

a means for detecting reception levels of the first group and the second group of the base stations; and a means for comparing the reception levels of the first group and the second group with each other to determine the hand-off time to produce the result of the monitoring.

27. The mobile station of claim 25, wherein no bidirectional communication between said mobile station to said base stations is required.

* * * * *